United States Patent [19]
Reis et al.

[11] Patent Number: 4,964,667
[45] Date of Patent: Oct. 23, 1990

[54] PROTECTIVE COVER FOR A VEHICLE

[76] Inventors: Farrell L. Reis, 11881 Kirkwood Rd., Herald, Calif. 95638; Gayle A. Helms, 1522 Q St., Riolinda, Calif. 95673

[21] Appl. No.: 261,261

[22] Filed: Oct. 24, 1988

[51] Int. Cl.⁵ .............................. B60J 11/00
[52] U.S. Cl. .................... 296/95.1; 296/136
[58] Field of Search ...................... 96/95.1, 136; 160/370.2; 2/243 B, 243 R

[56] References Cited

U.S. PATENT DOCUMENTS

| | | | |
|---|---|---|---|
| 2,646,118 | 7/1953 | Berty | 296/95.1 |
| 2,718,912 | 9/1955 | Zimmerman | 296/95.1 |
| 4,216,989 | 8/1980 | Tackett | 296/136 |
| 4,355,839 | 10/1982 | Rosen | 296/136 |
| 4,799,728 | 1/1989 | Akers et al. | 296/95.1 |

*Primary Examiner*—Robert R. Song
*Attorney, Agent, or Firm*—Bernhard Kreten

[57] ABSTRACT

A vehicle cover formed from foraminous material having a contour complemental to the vehicle to be covered and provided with a plurality of downwardly depending tethers strategically located and reinforced with wire rod to engage junctures associated with portals on the vehicle. The wire reinforcing has hooked upper portions and knotted lower portions to preclude the removal of the cover once the cover tethers are entrained in the portals.

19 Claims, 2 Drawing Sheets

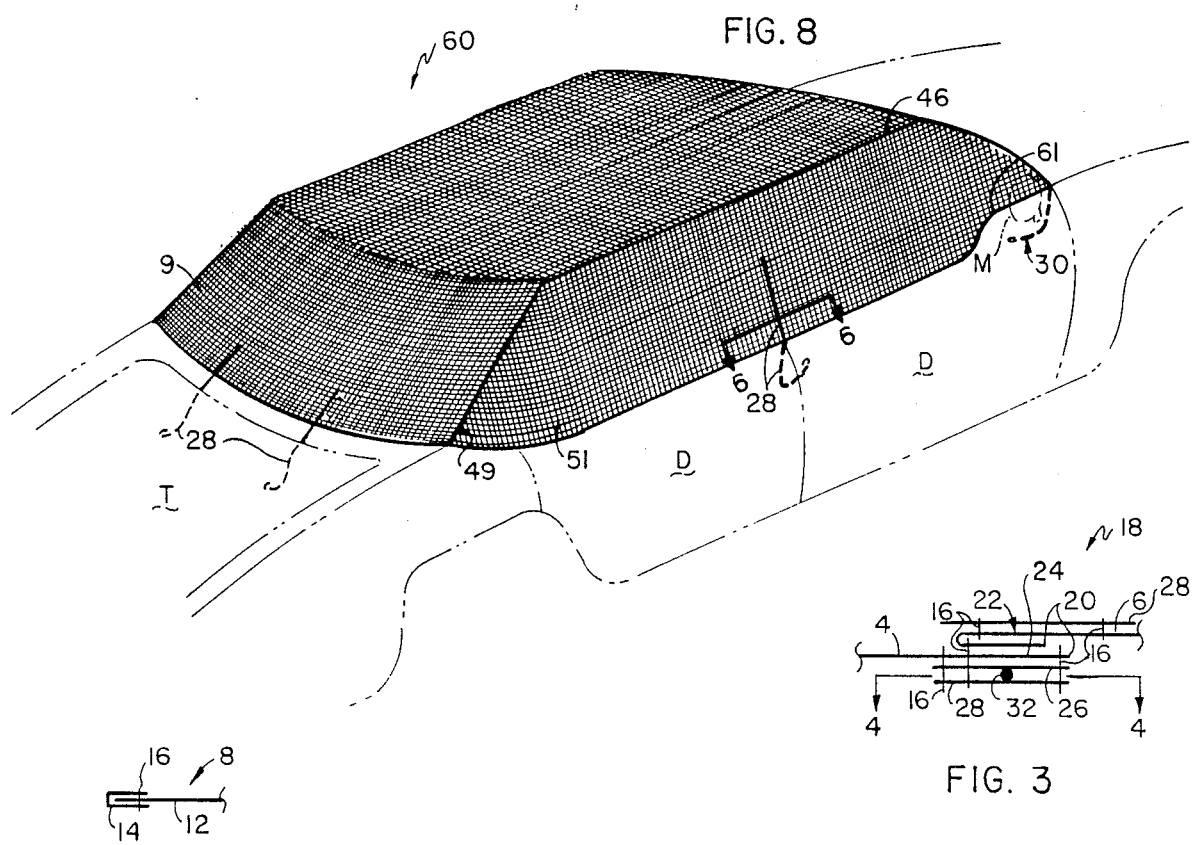
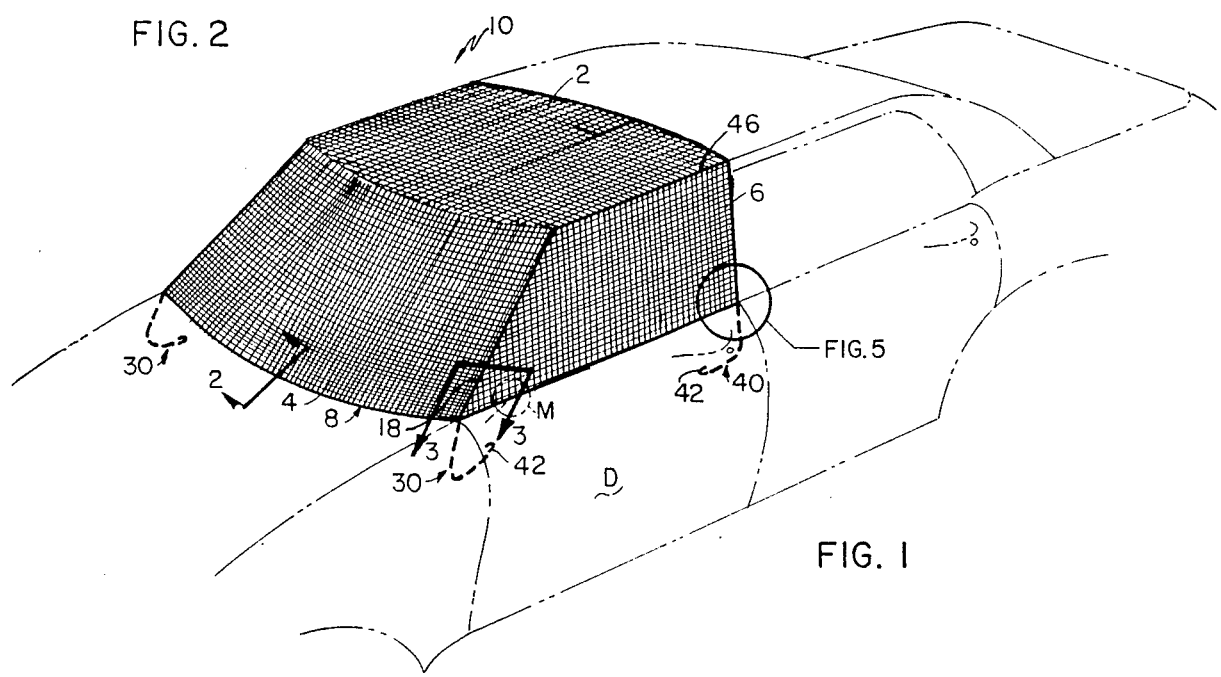

PROTECTIVE COVER FOR A VEHICLE

FIELD OF THE INVENTION

The following invention relates generally to a cover which is placed upon the top and window area of a vehicle such as a passenger car, pickup truck or the like. More particularly, the invention describes a cover made from a class of mesh materials including polypropylene which serves as a thermal break. This minimizes the through passage of actinic radiation into the interior of the parked vehicle first to protect the vehicle from the ravages of the heat and second to decrease the visibility of the interior of the vehicle when viewed from the outside. In addition, visibility when viewed from the inside of the vehicle looking out is not diminished to the same degree whereby visibility is still afforded a viewer on the inside of the vehicle.

BACKGROUND OF THE INVENTION

Utilization of one's car in the summertime poses certain problems particularly when the car is to be left in an area exposed to direct sunlight. The most common problem involves the build up of heat within the interior of a car. Cars exposed to direct sunlight during the summer months can attain an interior temperature well in excess of 130 degrees having a deleterious effect on not only the vehicle compartment but also the contents within the compartment. Conversely, vehicles in cold climates coupled with inclement weather allow ice formation on the windows when the vehicle is unprotected and left in the environment.

In addition, regardless of the climate, a vehicle left unattended in a public place invites inspection of the contents of the interior of the car since the windows provide no obstruction to one's view.

Prior art techniques are known to exist which have attempted to rectify at least one of the above mentioned exemplary problems. However, applicants are not aware of a device which can resolve all of the above mentioned problems while concomitantly being structured to reduce the likelihood that the resulting device is relatively difficult to purloin. The following patents reflect the state of the art of which applicants are aware and are tendered to discharge applicants' acknowledged duty to disclose prior art.

One known instrumentality is formed from cardboard and folded for storage in an accordion shape. The cardboard is configured to fit within the vehicle just inboard the windshield so that actinic radiation is barred from passing therebeyond. It should be noted that although most of these instrumentalities are highly reflective, since the device is installed within the interior of the car, heat is still generated within the vehicle's interior and is not dissipated since most likely the vehicle would be locked and all of the windows closed. A second, known instrumentality includes an opaque or transparent plastic membrane mrerly placed on an outer surface of the windshield and tethered to the vehicle by integrally formed strips of material normally configured as extensions of edge borders which are closed within the leading edge of the passenger and driver door. While this structure perhaps overcomes some of the objectionable features noted in the paragraph immediately supra, this device fails to provide structure which renders it less likely that the device will be purloined. Moreover, this device does not provide unidirectional opacity as does the instant invention.

A further known prior art instrumentality is generally defined as a complete car cover which only incidentally provides any of the above mentioned solutions to problems. The car cover is typically designed to serve as a "portable garage" and therefore is usually formed from soft cloth material which cannot be securely fastened to the car to such a degree that theft will have been precluded. Such a cover also does not provide unidirectional opacity, nor does it repel water or ice.

SUMMARY OF THE INVENTION

The instant invention is distinguished over the known prior art in a plurality of ways. First, when deployed the instant invention is attached to the car in a secure manner to minimize the possibility of unauthorized removal by theft. Structure is so configured with appropriate wire reinforcement strategically placed so that removal of the device by a thief will be more difficult and if successful will destroy the functional aspects of the device for subsequent use.

Second, the device is oriented to be placed on the outside of the car formed from material which renders visual access to the car's interior extremely difficult and the contents in the vehicle interior are relatively indiscernible. Surprisingly, however, visual access from within the interior to the outside is not as substantially restricted whereby an observer within the interior of the car with the device deployed can maintain visual contact with events outside the car.

Third, the instant invention provides a structure which more efficiently serves as a thermal break than the known prior art since its deployment on the outside of the car does not trap thermal radiation within the car but rather allows captured heat to be dissipated through both radiation and convection. It is to be noted that the device according to the present invention is minimally reflective and works primarily by absorption followed thereafter by convection and radiation.

Fourth, the immediately above mentioned properties combined with the structure of the device serve as a barrier during cold inclement weather thereby precluding ice formation on the protected window areas of the vehicle and obviating the need for scraping ice off the windshield on a cold icy day.

Succinctly and simplistically stated, the essence of the instant invention entails the use of a cover which envelopes a portion of a vehicle from a lower most edge of windows and windshields upwardly. The cover is placed on an outer surface of the vehicle and is formed from a material characterized in its ability to block visibility when viewing from the outside looking in. The cover serves as a thermal break exteriorly of the car's interior. The cover is securely fastened to the vehicle to preclude the likelihood of theft. By providing both a thermal and physical barrier, heat is blocked by absorption rendering the interior cooler. The cover is also a barrier to preclude the buildup of ice on the window in winter.

OBJECTS OF THE INVENTION

Accordingly, it is a primary object of the present invention to provide a new and useful car shade which not only keeps the interior of the car cooler, but also precludes visual access to the interior and serves as a barrier against the formation of ice in cold inclement weather.

A further object of the present invention is to provide a device as characterized above which can be securely affixed to a vehicle to render less likely the cover will be purloined and if so, the functional utility of the device will have been sufficiently compromised to nullify the benefits of unauthorized third party use.

A further object of the present invention is to provide a device as characterized above which is extremely durable in construction, lightweight and benefits from the economies of scale inherent in mass production techniques.

A further object of the present invention is to provide protection for sunroofs, "T"-tops, convertible tops and vinyl roofs from deterioration due to weather extremes.

A further object of the present invention is to provide a device as characterized above which can be quickly and easily deployed and removed as is needed by a single person.

Viewed from one vantage point, it is an object of the present invention to provide a window cover kit for vehicles which includes an instrumentality for covering side windows and a windshield of the vehicle with a mesh material that precludes heat and sight therebeyond, a plurality of tethers depending from the cover and strategically placed adjacent portals of the vehicle, the tethers inlcude a central core formed from material which is not easily frangible whereby the kit protects the windows and interior of the vehicle from both visual and thermal intrusion.

Viewed from a second vantage point, it is an object of the present invention to provide a device for covering a vehicle's window which includes a windshield covering panel including a pair of side edges, a pair of side window covering panels each having a leading edge, an instrumentality for connecting one side panel leading edge to one adjacent windshield side edge, and a tether instrumentality fastened to the connecting insturmentality and having a free end extending downwardly therefrom, the tether instrumentality including an integrally encased reinforcement element having a higher degree of resistance to cutting than material forming a remainder of the tether instrumentality, whereby the reinforcement element will not mar the vehicle yet securely attach the device to the vehicle.

Viewed from a third vantage point, it is an object of the present invention to provide a method for forming a cover on window areas of a vehicle or the like to reduce ice formation and thermal or visual throughpassage, the steps including: Tailoring a substantially rectangular blank of polypropylene by forming a windshield panel and adjacent window panels including removing excess material substantially the shape of two triangles from the blank to parallel both the slope of the windshield and the length of the windshield compared to its side windows, seaming together edges of the blank formed by removing the excess material, and superimposing on the seamed edged area a combined reinforcement strip and depending tether for attaching near a hinge area of a door of the vehicle.

These and other objects will be made manifest when considering the following detailed specification when taken in conjunction with the appended drawing figures.

BRIEF DESCRIPTION OF THE DRAWING FIGURES

FIG. 1 is a perspective view of the apparatus according to the present invention according to one embodiment.

FIG. 2 is a sectional view taken along lines 2—2 of FIG. 1 showing an edge fastening detail.

FIG. 3 is a sectional view taken along lines 3—3 of FIG. 1 showing a second edge seaming detail.

FIG. 8 is a perspective view of a third embodiment of the invention shown as a perspective looking from the rear of a vehicle.

BRIEF DESCRIPTION OF THE PREFERRED EMBODIMENTS

Figure 9:
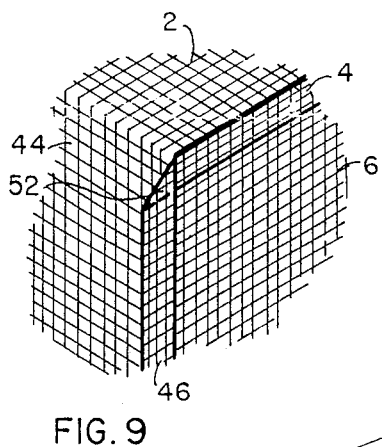
FIG. 9 shows a corner detail of FIG. 7, in perspective.

Referring to the drawings now, wherein like reference numeral refer to like parts throughout the various drawing figures, reference numeral 10 is directed to the protective cover according to a first form of the invention, 50 to a cover according to a second form of the invention and 60 to a cover according to a third form of the invention.

In its essence, each embodiment includes a front panel, a pair of side panels connectd to the front panel along respective leading and side edges thereof, and a means for fastening each cover to the vehicle. As suggested in the drawings and to be discussed more fully, a downwardly extending tether 30, 40 is placed at strategic areas along the length of the cover for insertion between a portal and a fixed area of the car, such as a car door or trunk lid.

More specifically, the embodiment shown in FIG. 1 includes the following. A blank of polypropylene initially configured as a sheet of rectangular material is tailored to accommodate the general configuration of the car to be protected with the cover. The polypropylene itself, although illustrative, is characterized as being a member of a family of materials having the characteristics of relative lightweight and configured as a mesh or screening which will attenuate a majority of light emanating from a primary source and attempting to pass through the mesh material. Generally, the screen's fineness will be in the order of magnitude of 400 holes per square inch, although acceptable ranges could be from 50 to 500 holes per square inch. The screen configuration is an important element in the construction of the instant invention. Because of this design, actinic radiation impinging on the shade effects the shade as though the light source were passing through a matrix of pinholes. From an observer within the vehicle, the light would be diffuse and abated somewhat. Since however the light is on the outside of the vehicle, although the observer within the vehicle can see out clearly, passerby peering into the vehicle will be unable to see with clarity any object contained within the vehicle. Thus, privacy has been enhanced by use of the shade.

In addition, the presence of a plurality of apertures assist in airflow which can facilitate thermal migration for keeping the cover, area adjacent to cover and therefore the vehicle relatively cool and benefitting from any air currents that may exist. Conversely, however during inclement weather particularly during winter, the mesh size coupled with the black color of the polypropylene combine to form an effective barrier and heat sink source whereby ice will not buildup on the windows of the vehicle.

The cover is constructed to be deployed on the outside of the vehicle. To effectuate same the embodiment of FIG. 1 includes a cover 10 configured from a rectangular blank and includes a roof panel 2, a windshield panel 4 extending forwardly of the roof panel 2 and integrally formed therewith. Side panels 6 are intended to obscure windows located thereunder, typically correspoonding to windows adjacent to the driver and a passenger. In order to conform the rectangluar blank to the geometry of a vehicle, the rectangular blank is cut 20 (FIG. 3) along the leading edge of side panel 6 and side edges of the windshield panel 4. Details of the seam 18 between the side and windshield panels are shown in FIG. 3.

The edge 24 of the windshield panel 4 underlies a dart 22 formed by doubling over the leading edge of the side window panel 6. As shown in FIG. 3, a bead of stitching 16 secures these two edges. Preferably, the edges are lapped together, stitched and then panel 6 is folded about the stitching 16 to form the dart 22. A single reinforcing strip (e.g. 28) can strengthen the seam and can be placed on either a top or bottom side of the seam, fixing a rod 32 therebetween. Optionally, first and second reinforcing strips 26 and 28 may be stitched to the edge 24 and dart 22 to provide a reliable connection. Note stitching 16 straddles the seam and runs the length of the strip. A wire rod 32 would be laminated between the upper and lower reinforcement strips for purposes to be assigned.

FIG. 2 reflects the general edge treatment 8 which circumscribes the cover 10 shown in FIG. 1. More specifically, each edge 12 is provided with a substantially U-shaped border 14 to provide protection of the fabric against fraying. As shown, stitching 16 fastens the border 14 to the edge 12. The border can be formed from the same material (polypropylene) as reinforcing strip 26, 28 discussed supra.

Figure 5:
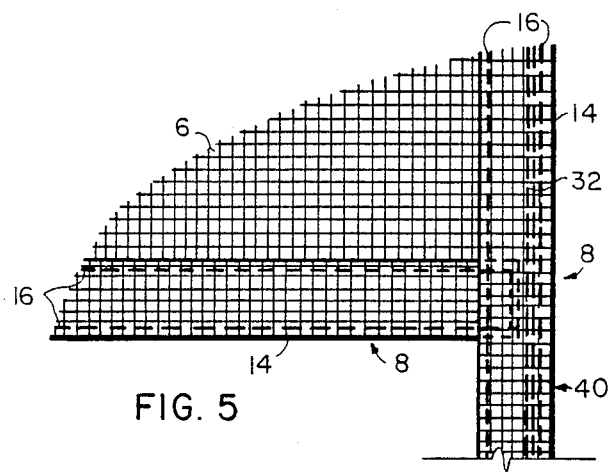
FIG. 5 is a top plan view of a portion of a second form of tether detail also used in FIG. 1 for example.

FIG. 5 reflects another edge technique for prevention of fraying and reinforcement. More particularly, the juncture of two U-shaped borders 14 occurs in the FIG. 1 embodiment just above the door handle and defines the confluence of a trailing edge and a bottom edge of the panel 6 overlying the side windows. The vertical border shown in FIG. 5 includes a vertically extending reinforcement element formed from wire rod 32 similar to that which was briefly touched upon with respect to the FIG. 3 configuration. The bottom edge border 14 nests within the vertical border and abuts the rod 32.

Figure 4:
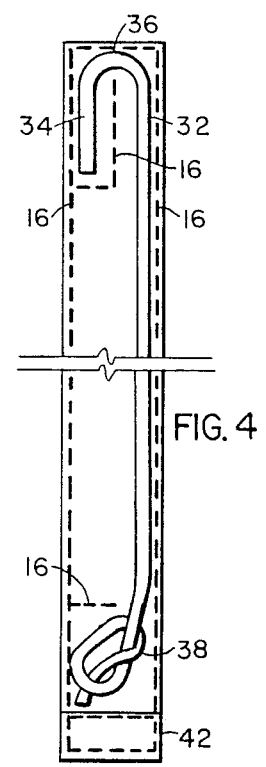
FIG. 4 is a plan view schematic of one attaching tether shown in FIG. 3 according to the present invention with portions removed for greater clarity.

Note that each wire 32 is located near an edge of a door, one door edge being the access for a rider and another door edge being the hinge area of the same door. Each wire 32 is configured as shown in FIG. 4 with a hooked upper portion having a free end 34 and a bight portion 36. The lower most end of each wire rod has a knotted end 38 which has been shown for illustrative purposes as a half-hitch knot. However, the knot is optional. The wire reinforced tether 30 nearest the hinge of the driver's side door is to be placed between the door and the body of the car where upon, when closing the door, the tether is constrained to remain therewithin. Similarly, the tether 40 nearest the door handle is to be placed between the door and the body when securing that portion of the cover thereto.

Figure 6:
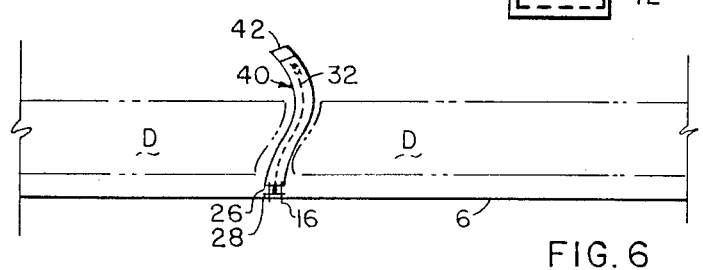
FIG. 6 is a sectional view taken along lines 6—6 of FIG. 8.

Note the hooked upper end 34 of the wire is placed between the reinforcement strip 28 and polypropylene as mentioned supra. Stitching 16 surrounds the hooked upper end including a central area between the two legs and the bight portion 36 defining the hook. This secures the wire into the tether so that it cannot be removed easily. Similarly, the lower end of the wire 32 is providee with a wire knot 38 and reinforced with stitching 16 circumscribing the knot to make it difficult for the know to be removed. In addition, the free end of each tether 30 and 40 both have doubled over portions 42 where the material is folded over itself for added strength. FIG. 6 shows the detail of tether 40 and its placement in the door D.

Figure 7:
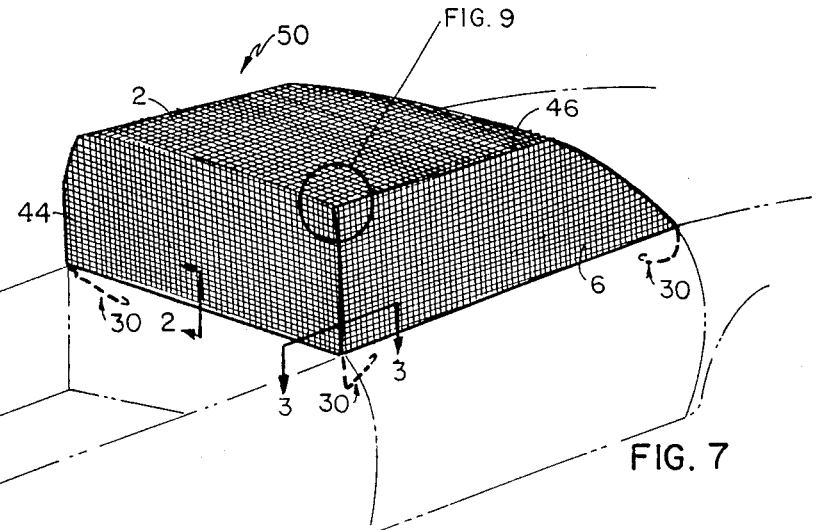
FIG. 7 is a perspective view of the apparatus according to the present invention according to a second embodiment.

Having described the fundamental aspects of the stitching details, the construction with respect to the two embodiments in FIGS. 7 and 8 can be readily understood. With respect to FIG. 7, it differs primarily from the FIG. 1 version in that a rear window panel 44 extends downwardly from the top panel 2. This structure lends itself for deployment on pickup trucks similarly configured. To facilitate this, the upper and lower reinforcing strips 26 and/or 28 of FIGS. 1 and 3 continue along a top most edge 46 of the roof line and thence downwardly along the trailing edge of the side panel 6. To use one continuous strand of reinforcement 28, the upper and lower reinforcement strips 46, 48 are folded as shown in FIG. 9 to form a substantially triangular gusset 52 so that the reinforcement strips 46, 48 can make the 90° bend required to extend downwardly from the roof line 46. When this construction technique is used, the seam detail of FIGS. 3 and 4 are provided rather than that which was shown in FIGS. 2 and 5 because adjacent panels 6, 44 of polypropylene are being seamed together. Noted roof line 46 can be a similar seam structure. This seam detail can also be used along the roof line in FIG. 1.

FIG. 8 shows a further version, where the cover extends completely along a top portion of the car down over all of the windows of the vehicle. At a minimum, tethers similar to those discussed with respect to FIGS. 1 and 7, i.e. on all side edges of the passenger and driver doors are appropriate. However, should the model of vehicle be a four-door, a further tether may be placed adjacent the opening of the rear door. Alternatively it may be desirable to place tethes 40 at the trailing edge of the cover to allow the cover to be locked by placing the tethers into the hinge area of the truck T enclosed thereupon. In this scenario, six areas for reinforcement strips 28 are provided and correspond to the structure shown in FIG. 4. However, there is no need to cut the polypropylene either at the reinforcing 28 that extends vertically just at the door handle area on the driver's and passenger's side or at the rear window panel. Instead, rear panel 9 is seamed (as in FIG. 3) at its juncture 49 with side panels. Roof line 46 is also seamed as in FIG. 3. Note also the cutaway clearance 61 provided on the front-side area of the cover to accomodate a mirror M.

In use and operation, the device is removed from storage, perhaps from the vehicle and deployed on the top of the car. Depending upon the style of car and cover, the tethers are threaded through openings in the portals, whether they be a trunk lid or a passenger door and the portal is closed and locked entraining the tether therewithin. Because of the wire, its dimension is such that when coupled with the knotting reinforcement at the lower most portion, it is large enough to thwart unauthorized entry, but not so large as to interfere with the operation of the door. Moreover, having thus described the invention, it should be apparent that numerous structural modifications and adaptations may be resorted to without departing from the scope and fair meaning of the instant invention as discussed here and above and is claimed here and below:

1. A window cover kit for vehicles comprising in combination:

cover means including a front panel and a pair of side panels of a mesh material for covering side windows and a windshield of the vehicle that precludes heat and sight therebeyond, a plurality of tethers depending from said cover means and strategically placed adjacent vehicle portals, said tethers including a central core formed from not easily frangible material, said core and tethers fastened to said cover means, whereby said kit protects the windows and interior of the vehicle from both visual and thermal intrusion, wherein said central core is formed from wire material, and wherein said tethers depend from said cover means along the intersection of a leading edge of said side window and a side edge of said windshield by means of a dart formed from said mesh material of leading edges of said side panels and lapped over free side edges of said mesh material of said front panel, stitching and coupling said edges together, and an upper and a lower reinforcing strip sewn and overlying said dart, said wire interposed between said reinforcement strip and said dart.

2. The kit of claim 1 wherein said wire has a hooked upper end and a knotted lower end and stitching circumscribes said upper and lower ends.

3. The kit of claim 2 wherein a lower most portion of said tether means is not provided with said wire but instead has a doubled over portion formed by folding said reinforcing strip over to provide two-ply material and sewn together.

4. The kit of claim 3 wherein a trailing vertical edges of said side panels include a U-shaped border sewn thereto, and a wire core contained within said border and adjacent a bight portion of said U-shaped border extends downwardly to provide a second said tether means, said wire having a hooked upper end and a knotted lower end circumscribed by stitching and said U-shaped border has a lower most portion below said knotted end which is of two-ply material from having been doubled over and stitched.

5. A device for covering a vehicle's window, comprising, in combination:

a windshield covering panel including a pair of side edges, a pair of side window covering panels each having a leading edge, means for connecting one said leading edge to an adjacent side edge, windshield tether means fastened to said connecting means and having a free end extending downwardly therefrom, said tether means including an integrally encased reinforcement element having a higher degree of resistance to cutting than material forming a remainder of said tether means, whereby said reinforcement element will not mar the vehicle yet securely attach the device to the vehicle.

6. The device of claim 5 wherein a top panel is provided integrally formed with said windshield covering poanel and connecting each of said pair of said side window panels.

7. The device of claim 6 including a tether means depending from a trailing vertical edge of said side panel provided with an integrally encased reinforcement element therewithin.

8. The device of claim 7 wherein a trailing edge of said top panel is integrally formed with a downwardly extending back panel, and means for connecting said trailing vertical edges of said side panels to outboard edges of said backpanel.

9. The device of claim 6 wherein said top panel extends rearwardly to a lower most edge of a rear window, and said side panels extend and are fastened to a side edge of said top panel.

10. The device of claim 9 including tether means extending from an area of conjunction between said side panels and said top panel including a reinforcement element adapted to be entrained in a portal.

11. The device of claim 5 wherein said reinforcement element is a substantially elongate wire rod having a hooked upper portion and a knotted lower portion encased with an upper and lower reinforcement strips defining said tether means.

12. A method for forming a cover on window areas of a vehicle or the like to reduce ice formation and thermal or visual throughpassage, the steps including;

tailoring a substantially rectangular blank of polypropylene by forming a windishield panel and adjacent side window panels includng removing excess material substantially in the shape of two triangles from the blank to parallel both the slope of the windshield and the length of the windshield compared to its side windows, seaming together edges of said blank formed by removing the excess material, and superimposing on the seamed edged area a combined reinforcement strip and depending tether for attaching near a hinge area of a door of the vehicle.

13. The method of claim 12 including the steps of forming the reinforcement strip and depending tether from a pair of spaced upper and lower reinforcing strips, sandwiching a wire therebetween.

14. The method of claim 13 including forming an upper end of the wire element as a hook.

15. The method of claim 14 including forming the lower end of the wire element as a knot.

16. The method of claim 15 including reinforcing the wire at upper and lower extremities by stitching.

17. The method of claim 16 including the step of tailoring the substantially rectangular blank of polypropylene by forming a rear panel at a trailing edge thereof.

18. The method of claim 17 including the steps of deploying reinforcement strips and depending tethers strategically along the portions of the cover to engage portals on the vehicle.

19. A window cover kit for vehicles comprising in combination:

means for covering side windows and a windshield of the vehicle with a mesh material that precludes heat and sight therebeyond, a plurality of tethers depending from said cover means and strategically placed adjacent vehicle portals, said tethers including a central core formed from not easily frangible material, said tethers embedded within and extending in said cover, and, said core and tethers fastened to said cover means, whereby said kit protects the windows and interior of the vehicle from both visual ad thermal intrusion.

* * * * *